United States Patent [19]
Chouffier et al.

[11] Patent Number: 5,859,514
[45] Date of Patent: *Jan. 12, 1999

[54] CONTROL METHOD FOR A START-UP CONTROL UNIT AND AN APPARATUS TO MAKE USE OF THIS METHOD

[75] Inventors: Jean-Louis Chouffier, Menilles; Hubert Cornilleau, Verneuil Sur Seine; Pascal Duclos, Paris, all of France

[73] Assignee: Schneider Electric SA, Boulogne-Billancourt, France

[ * ] Notice: This patent issued on a continued prosecution application filed under 37 CFR 1.53(d), and is subject to the twenty year patent term provisions of 35 U.S.C. 154(a)(2).

[21] Appl. No.: 641,748

[22] Filed: May 2, 1996

[30] Foreign Application Priority Data

May 5, 1995 [FR] France ................................. 95 05502

[51] Int. Cl.$^6$ ..................................................... H02P 7/00
[52] U.S. Cl. ......................... 318/432; 318/434; 318/430; 318/474; 318/778; 318/802; 318/807
[58] Field of Search ................................... 318/430, 432, 318/434, 254, 138, 439, 778–797, 445.6, 447, 474, 499–537, 798–815

[56] References Cited

U.S. PATENT DOCUMENTS

| | | | |
|---|---|---|---|
| 4,392,099 | 7/1983 | Kuniyoshi | 318/797 |
| 4,455,522 | 6/1984 | Lipo | 318/809 |
| 4,672,288 | 6/1987 | Abbondanti | 318/806 |
| 5,008,608 | 4/1991 | Unsworth et al. | 318/729 |
| 5,097,193 | 3/1992 | Neis et al. | 318/800 |
| 5,430,362 | 7/1995 | Carr et al. | 318/779 |
| 5,483,140 | 1/1996 | Hess et al. | 318/802 |
| 5,585,708 | 12/1996 | Richardson et al. | 318/800 |

FOREIGN PATENT DOCUMENTS

| | | |
|---|---|---|
| 0 030 497 | 6/1981 | European Pat. Off. . |
| 0 194 400 | 9/1986 | European Pat. Off. . |
| 0 446 936 | 9/1991 | European Pat. Off. . |
| 0 621 680 | 10/1994 | European Pat. Off. . |

*Primary Examiner*—David Martin
*Attorney, Agent, or Firm*—Oblon, Spivak, McClelland, Maier & Neustadt, P.C.

[57] ABSTRACT

A method for the control of a load, such as a motor, by means of a start-up controller (1) connected, on the one hand, to a fixed frequency alternating supply, and, on the other hand, to the motor, and including static switches associated with at least one phase of the motor and operated by a control circuit (2), characterized in that the electromagnetic torque ($C_m$) of the motor is automatically controlled to a variable reference value ($C_{cons}$) in the start-up or deceleration stage of the motor.

8 Claims, 3 Drawing Sheets

CONTROL METHOD FOR A START-UP CONTROL UNIT AND AN APPARATUS TO MAKE USE OF THIS METHOD

This invention relates to a method of control of a load, such as a motor, by means of a start-up controller connected, on the one hand, to an alternating fixed frequency supply network, and, on the other hand, to the motor, and including static switches connected to at least one phase of the motor and guided by a control circuit.

A start-up controller is commonly used in association with a motor to start it or decelerate it in a progressive fashion.

The switching-on of a motor and its start-up (progressive acceleration of the electrical speed) normally generate electrical constraints such as raised current consumption with high current surges possibly reaching six to eight times the nominal current $I_N$. The role of the start-up controller is, therefore, to ensure the start-up of the motor by progressively increasing the voltage applied to the motor without the appearance of current surges. A method of modulating the effective value of the voltage consists of imposing a delay on passing the current in a way that reduces the conduction time of the switches. The triggering delay, relating to the current, is the time passed between the moment the current is cut off in one phase of the motor and the current being re-triggered in this phase. It is for the user to regulate, advantageously, this delay in a way that ensures a switching on and a start-up of the motor without current surges.

The start-up of the motor may also carry with it mechanical constraints such as jolts or jerks on the motor. The aforementioned method certainly allows the electrical constraints to be limited but does not conclusively prove itself capable of limiting the mechanical constraints.

When the start-up controller is used as a deceleration device, the control parameter used is generally also the delay in triggering the switches. This known method nevertheless has the same disadvantages as those at start-up.

The purpose of the invention is to limit in a sufficient manner the electrical constraints and the mechanical constraints brought about by start-up and deceleration of a motor controlled by a start-up controller.

To achieve this result, the method consists of setting up feedback control of the electromagnetic torque of the motor to a variable reference value in the start-up or deceleration period of the motor. The value of the torque is determined and compared so as to establish an error signal which is then processed to send out a new value for the triggering delay with which the switches are controlled.

The determination of the torque is carried out by determining, respectively, the power supplied by the electrical supply to the motor and the stator losses.

The power supplied will preferably be calculated from the fundamental value of the current of at least one phase of the load, and from the phase delay of the fundamental current of at least one phase in relation to the corresponding simple voltage of the electrical supply. This method of calculation, as opposed to a known method of calculation that uses instantaneous current and voltage values, allows the cost of the apparatus making use of the method, to be reduced since it is not necessary to use voltage sensors; it is only useful to use at least one current sensor.

An apparatus making use of the method specified above comprises means for feedback control of the electromagnetic torque which include means for determining the torque, a comparator to determine an error signal between the determined value of the torque and a reference value and an integrator to process the error signal and to deduce from it an triggering delay value applied to the control circuit.

The invention will now be described in more detail by way of an example, referring to the appended drawings.

Figure 1:
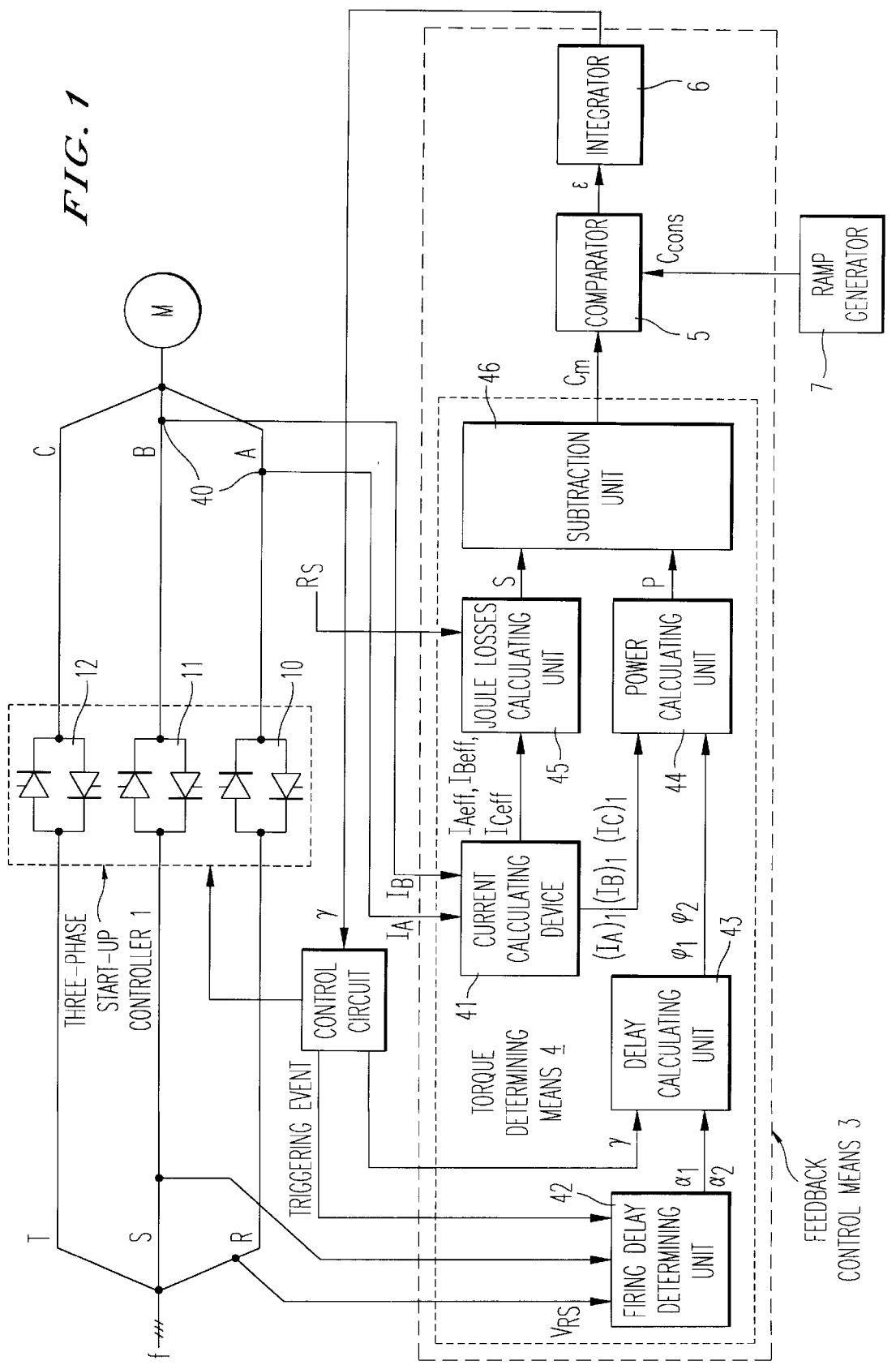
FIG. 1 is a block diagram of the embodiment for control of a start-up controller linked to a motor according to the invention.

The three phase start-up controller, according to the invention, denoted 1 on FIG. 1, is connected to phase conductors R, S, T of a three phase fixed frequency f electrical supply. The start-up controller includes three pairs 10, 11, 12 of static switches; each pair is made up of two thyristors mounted head to foot and is connected respectively to a winding of phases A, B and C of a three phase asynchronous motor M. The gates of the thyristors are controlled by a control circuit 2. In place of thyristors, one may, of course, use other controllable switches.

The command circuit 2 has the task of sending the thyristors firing commands which are characterised by a time γ, called the triggering delay and referenced to the current. This time γ is the time difference between the moment of the last passage of the current to zero in one phase of the motor and the moment when the current is retriggered, in this phase, when the current changes direction.

The means 3 of feedback control of the torque $C_m$ of the motor are connected to the motor and to the control circuit 2 for the thyristors. These means allow the so-called closed loop process to occur. They include means 4 for determining the value of the motor torque $C_m$, a comparator 5 which determines the error signal ∈ which is a function of the difference between the value $C_m$ determined for the torque and a reference value $C_{cons}$, and an integrator 6 to process the error signal ∈ in order to calculate a value γ for the triggering delay which is introduced into the control circuit 2.

The means 4 for determining the torque enable a calculation to be made of the electromagnetic torque of the motor. The torque is calculated from the fixed cycle $\Omega_S$ of the electrical supply ($\Omega_S = 2\pi f$) and from the power $P_E$ transmitted within the gap of the motor which can be determined from the power P transmitted by the electrical supply to the motor and the stator losses S, determined in the form of Joule losses, iron stator losses being negligible for the given embodiment.

Note that it is necessary to take account of stator losses S for the torque feedback control so as to achieve a soft start-up. Torque feedback control is not actually equivalent to power feedback control.

Figure 2A:
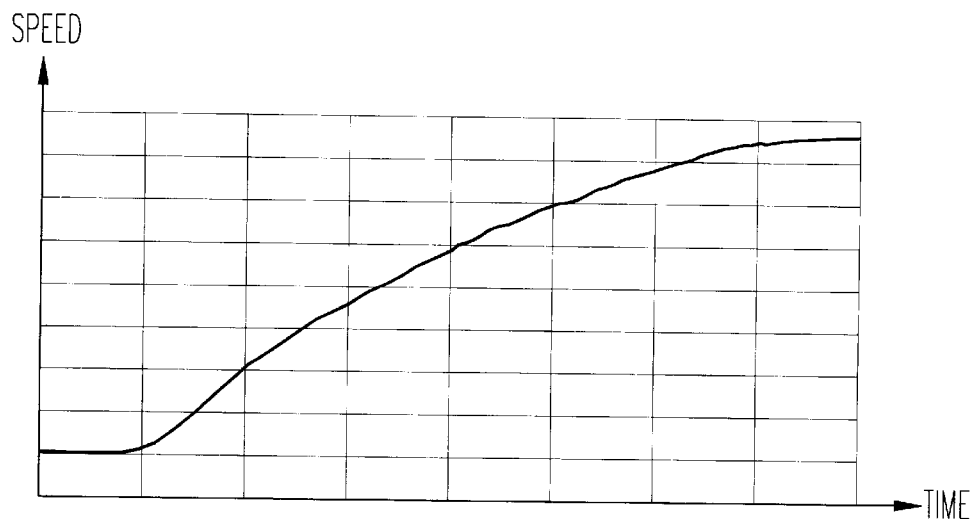
FIGS. 2a, 2b and 2c show graphs of the speed, the torque and the power versus time during simulation of torque feedback control.
Figure 2B:
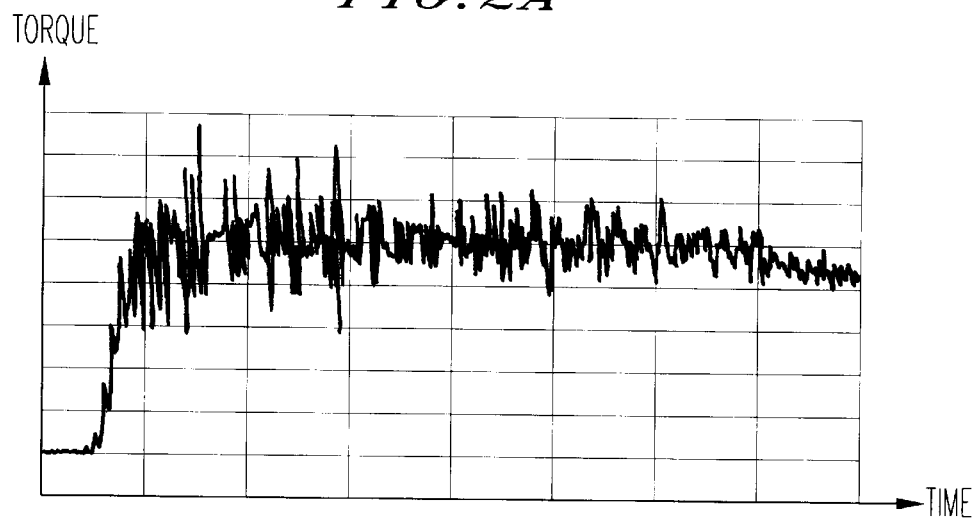
Figure 2C:
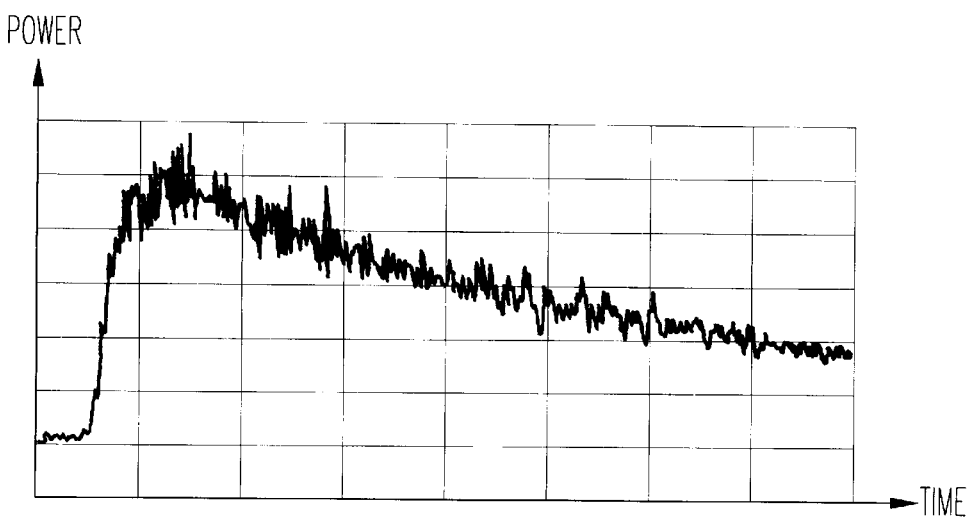

Hence, FIGS. 2a, 2b and 2c showing, respectively, the changes in speed, torque and power when feedback control of the torque is to a substantially constant value, illustrate that the value of the power (FIG. 2c) does not stay constant during the feedback control phase.

Figure 3A:
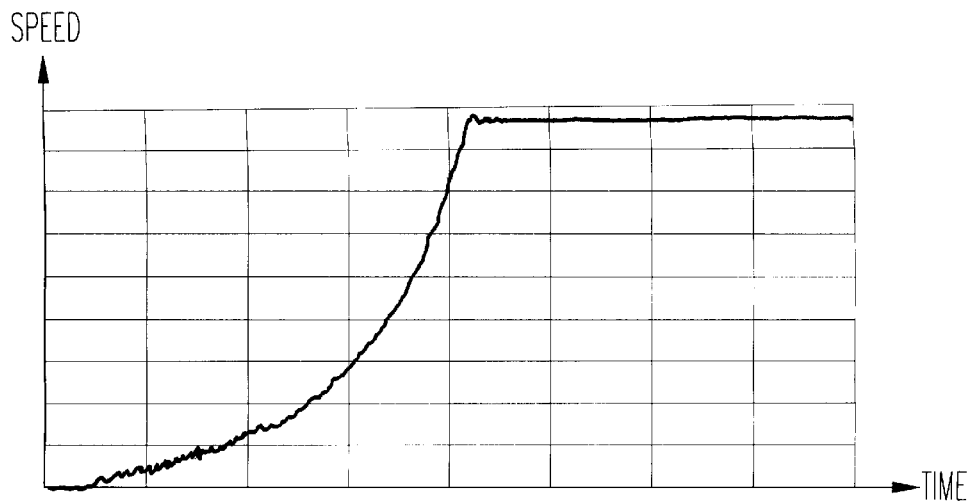
FIGS. 3a, 3b and 3c show graphs of the speed, the power and the torque versus time during simulation of power feedback control.
Figure 3B:
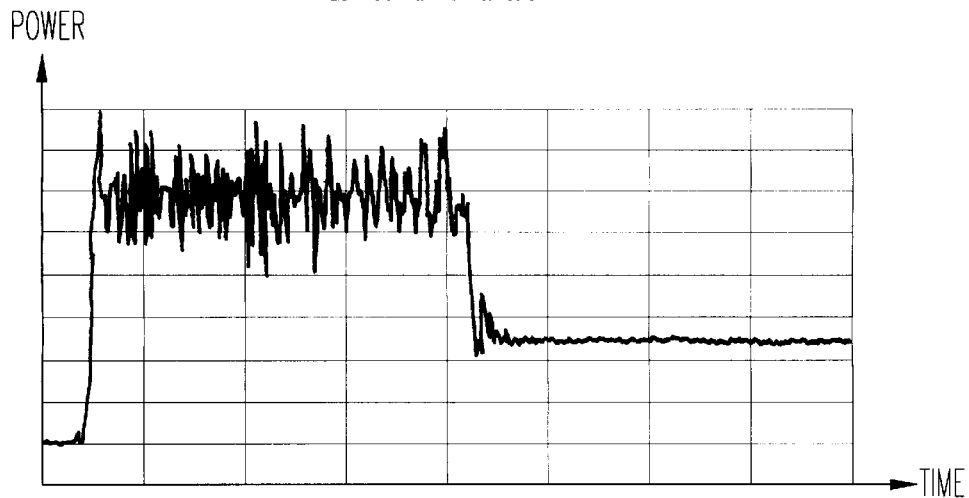
Figure 3C:
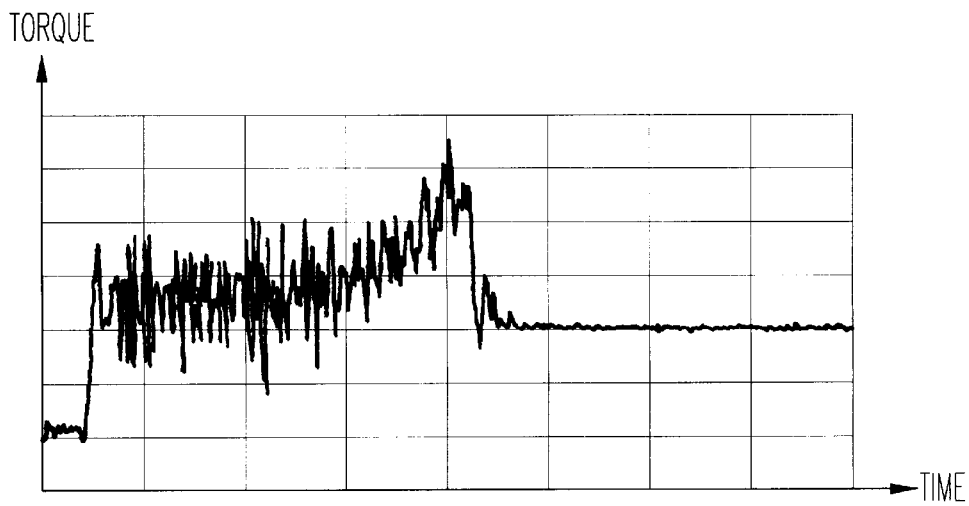

For confirmation, FIG. 3a, showing the changes in speed during power feedback control to a substantially constant value (FIG. 3b), shows a curve with an acceleration gradient much less soft than that for the speed curve shown in FIG. 2a with torque feedback control. In order to determine the active power P and the stator losses S, so as to deduce from them the electromagnetic torque $C_m$, means 4 for determining torque $C_m$ include devices for reading the current 40, a device for calculating the current 41, a unit 42 for determining the firing delay $\alpha$ of the thyristors referenced to the voltage, a unit 43 for calculating the delay $\phi$ from the fundamental current to the voltage, a unit 44 for calculating the power P transmitted to the motor, a unit 45 for calculating the Joule losses S, and a subtraction unit 46 for calculating the torque $C_m$ of the motor.

The devices 40 for reading the current are, for example, two in number, to supply signals $I_A$ and $I_B$ representative of the currents circulating in phases A and B of the motor, respectively. The calculation device 41 situated downstream of the reading devices 40 allows, from these signals, the signal $I_C$ of the current circulating in phase C to be deduced, each fundamental current $(I_A)_1$, $(I_B)_1$, $(I_C)_1$, to be extracted and the resultant effective current values $I_{Aeff}$, $I_{Beff}$, $I_{Ceff}$ on the three phase motor side, to be calculated.

The unit 42 allows determination of the firing delay $\alpha$ to the current triggering in the thyristors referenced to the simple electrical supply voltage; this delay corresponding to the time passed between the moment the simple voltage applied to one phase of the start-up controller, supply side, passes to zero and the moment when the current is retriggered in the thyristors, corresponding to the same phase.

Unit 42 reproduces the simple voltage signal from phase R of the electrical supply from the measurement of the phase to phase voltage $V_{RS}$ between phases R and S of the electrical supply. A means of evaluating the time $\alpha$ can, for example, consist of a counter within unit 42; the counter is triggered each time the simple voltage passes to zero and gives the time passed $\alpha_1$ until the subsequent occurrence of the event, emitted by the control circuit 2, of triggering current $I_A$ in the pair 10 of thyristors. In an identical manner, unit 42 determines and also supplies the firing delay $\alpha_2$ for phase B of the motor.

The calculating unit 43 receives, as its input, on the one hand, values $\alpha_1$ and $\alpha_2$ transmitted by unit 42, and, on the other hand, the value $\gamma$ supplied by control circuit 2. Unit 43 supplies at its output, the values $\phi_1$ and $\phi_2$ representing the delay of the fundamental current $(I_A)_1$ on the simple voltage of phase R of the electrical supply and the delay of the fundamental current $(I_B)_1$ on the simple voltage of phase S of the electrical supply, respectively. The calculation of the delay of the fundamental current is made from the known relationship $\phi = \alpha - \gamma/2$.

The calculation unit 44 receives as its input the values $\phi_1$ and $\phi_2$ and the values of each fundamental current $(I_A)_1$, $(I_B)_1$, $(I_C)_1$ and the voltage supplied by the electrical supply. The voltage is assumed to be constant and parametered but may be measured in a variant of the invention. Unit 44 supplies at its output the power P transmitted to the motor.

The calculation unit 45 receives at its input, on the one hand, the effective current values $I_{Aeff}$, $I_{Beff}$, $I_{Ceff}$ and, on the other hand, the value of the stator resistance $R_S$ which is a parameter which can be regulated according to the type of motor used. The unit generates, at its output the value S of the Joule losses $RI^2$ taken in with that for stator losses.

The subtraction unit 46 receives at its input the transmitted power P and the losses S to supply at its output the value of the torque $C_m = (P-S)/\Omega_S$.

The comparator 5 receives at its two inputs, respectively, the determined value of the torque $C_m$ and the value of the reference torque $C_{cons}$ imposed by a ramp generator 7 which determines an acceleration ramp and a deceleration ramp. It compares these two values and supplies, at its output an error signal $\in$ which is sent to the input of the integrator 6. The integrator establishes, at its output a new value for the delay $\gamma$ to the triggering, equal to the preceding value incremented by a value which is a function of the error $\in$ so as to correct the motor torque. This new value $\gamma$ is, in return, applied to the control circuit 2.

The operation of the device to put the method into use will now be described.

The control circuit gives the command to energize the thyristors as soon as the triggering delay time $\gamma$ has passed.

The devices for reading current 40 supply signals of current $I_A$ and $I_B$ circulating in phases A and B of the motor, respectively. Using device 41, values of each fundamental current $(I_A)_1$, $(I_B)_1$, $(I_C)_1$ and the values of effective currents $I_{Aeff}$, $I_{Beff}$, $I_{Ceff}$ are deduced from these signals. These values are sent to units 44 and 45.

Furthermore, unit 42 determines the firing delay values $\alpha_1$ and $\alpha_2$ referenced on the voltage; these values are then sent to unit 43 which, in turn, sends to unit 44 the values $\phi_1$ and $\phi_2$ representing the delay of the fundamental current on the simple electrical supply voltage.

The calculation units 44 and 45 supply the values of the power P transmitted to the motor and the stator losses S, respectively.

Then, the calculation unit 46 supplies the value of the motor torque $C_m$ from the P and S data.

The comparison of the torque and its processing are carried out in a way which is itself known; the new value of the triggering delay is applied, on returning to the control circuit 2.

Obviously, modifications can be made to the embodiment described without departing from the scope of the invention.

As a variant, the triggering delay, that is, the firing delay integrated into the control circuit 2 which drives the thyristors may not be referenced to the current, as described above, but referenced to the simple voltage. The value of the firing delay $\alpha$, referenced to the simple voltage, is then applied to the control circuit 2 and the value of the triggering delay $\gamma$, referenced to the current, is then determined by unit 42. The determination of $\gamma$ is carried out by monitoring the voltage to terminals of the thyristors; a counter is triggered as soon as a voltage appears, which indicates that no current is passing in the thyristors, and outputs the time passed to the moment the current, emitted by the control circuit 2, is triggered.

We claim:

1. A start-up controller for controlling a load having an electromagnetic stator, said controller comprising:

a) a fixed frequency alternating electrical supply having an output connected to said load through a plurality of static switches;

b) control means for outputting at least one trigger signal to said static switches;

c) feedback control means for controlling an electromagnetic torque, said feedback control means further comprising:

i) means for determining the electromagnetic torque, said determining means further comprising:
a device for calculating the electromagnetic torque having an output;
phase calculating means having an output;
said phase calculating means including means for calculating a time between a predetermined input voltage phase of said electrical supply and said trigger signal;
a device for calculating power transmitted to said load by said electrical supply outputting a power value using the output of the phase calculating means;

a device for calculating stator losses outputting a power value; said device for calculating electromagnetic torque receiving power values outputted by said device for calculating transmitted power and said device for calculating stator losses;

ii) comparator means for determining an error signal between said electromagnetic torque output and a reference value;

iii) integrator means for integrating said error signal and outputting a triggering delay value to control the output of said control means.

2. A start-up controller according to claim 1, wherein said phase calculating means further comprises means for calculating a time $\phi$ between the predetermined input voltage phase of said electrical supply and a fundamental current according to the formula $\phi=\alpha-\gamma/2$, where $\alpha$ is the time between the predetermined input voltage phase of said electrical supply and said trigger signal, and $\gamma$ is said triggering delay value.

3. A start-up controller according to claim 2, wherein said means for determining electromagnetic torque further comprises:

at least one current measuring device for measuring a current through at least one phase of said load;

a current determining device for determining at least one fundamental current and at least one effective current;

said current reading device connected to said current determining device; and said current determining device outputting values to said device for determining stator losses and said device for calculating power transmitted to said load.

4. A method for controlling a load having a stator by means of a start-up controller, said load connected to a fixed frequency alternating electrical supply through a plurality of static switches comprising the steps of:

determining an electromagnetic torque of said load, said step of determining electromagnetic torque further comprising the steps of:

calculating stator losses associated with said load;

calculating a phase difference;

said step of calculating a phase difference further comprising the step of calculating a time between a predetermined input voltage phase of said electrical supply and a trigger signal for triggering said static switches;

calculating a transmitted power to said load from said phase difference, a fundamental current in at least one phase of said load, and a voltage of said electrical supply;

calculating the electromagnetic torque of said load from said transmitted power and from said stator losses;

determining an error signal from a comparison between said calculated torque and a reference value; and generating a triggering delay value from said error signal and using said triggering delay value to control said trigger signal.

5. A method according to claim 4, wherein the voltage of said electrical supply is assumed to be constant.

6. A method according to claim 4, wherein the voltage of said electrical supply is measured.

7. A method according to claim 4, wherein said step of calculating a phase difference further comprises the step of calculating a time $\phi$ between the predetermined input voltage phase of said electrical supply and said fundamental current according to the formula $\phi=\alpha-\gamma/2$, where $\alpha$ is the time between the predetermined input voltage phase of said electrical supply and said trigger signal, and $\gamma$ is said triggering delay value.

8. A method according to claim 4, comprising the further steps of:

measuring, in at least one phase of said load, a current through said at least one phase of said load; and calculating a fundamental current value and an effective current value from said measured current through at least one phase of said load;

wherein said step of calculating stator losses utilizes said effective current.

* * * * *